(12) United States Patent
Liu

(10) Patent No.: US 12,332,915 B2
(45) Date of Patent: Jun. 17, 2025

(54) INTERNET OF THINGS DEVICE MANAGEMENT METHOD AND APPARATUS APPLIED TO EDGE COMPUTING PLATFORM, MEDIUM, AND ELECTRONIC DEVICE

(71) Applicant: TENCENT TECHNOLOGY (SHENZHEN) COMPANY LIMITED, Shenzhen (CN)

(72) Inventor: Zhenyu Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/326,137

(22) Filed: May 31, 2023

(65) Prior Publication Data

US 2023/0306042 A1    Sep. 28, 2023

Related U.S. Application Data

(63) Continuation of application No. PCT/CN2022/104269, filed on Jul. 7, 2022.

(30) Foreign Application Priority Data

Jul. 23, 2021 (CN) .......................... 202110834668.6

(51) Int. Cl.
*G06F 16/27* (2019.01)
*G06F 9/445* (2018.01)

(52) U.S. Cl.
CPC ........ *G06F 16/273* (2019.01); *G06F 9/44505* (2013.01)

(58) Field of Classification Search
CPC ... G06F 16/273; G06F 16/178; G06F 9/44505
See application file for complete search history.

(56) References Cited

U.S. PATENT DOCUMENTS 11,397,750 B1 * 7/2022 Lekakis ................ G06F 16/275
11,588,859 B2 * 2/2023 Keiser, Jr. ........... H04L 63/0227
(Continued)

FOREIGN PATENT DOCUMENTS

CN         103001862 A     3/2013
CN         110019197 A     7/2019
(Continued)

OTHER PUBLICATIONS

The World Intellectual Property Organization (WIPO) International Search Report for PCT/CN2022/104269 Sep. 15, 2022 7 Pages (including translation).

(Continued)

*Primary Examiner* — Hares Jami
(74) *Attorney, Agent, or Firm* — ANOVA LAW GROUP, PLLC

(57) ABSTRACT

A management method for an Internet of Things device includes: generating a reported value storage space and a desired value storage space for the Internet of Things device; receiving device actual configuration data reported by the Internet of Things device, and storing the device actual configuration data into the reported value storage space; receiving a configuration instruction that is transmitted by a control end of the Internet of Things device and that includes desired configuration data, and storing the desired configuration data into the desired value storage space; and synchronizing the desired configuration data stored in the desired value storage space into the Internet of Things device when the desired configuration data stored in the desired value storage space is different from the device actual configuration data stored in the reported value storage space.

19 Claims, 7 Drawing Sheets

(56) References Cited

U.S. PATENT DOCUMENTS

| | | | |
|---|---|---|---|
| 11,818,146 B2* | 11/2023 | dos Santos | H04L 63/1416 |
| 2009/0125277 A1* | 5/2009 | Wetzer | G06Q 10/20 |
| | | | 702/184 |
| 2014/0078930 A1* | 3/2014 | Bevemyr | H04L 41/0226 |
| | | | 370/254 |
| 2015/0116127 A1 | 4/2015 | Lynch et al. | |
| 2018/0262394 A1* | 9/2018 | Sakura | H04L 67/12 |
| 2019/0394061 A1 | 12/2019 | Chen et al. | |
| 2020/0119979 A1* | 4/2020 | Woodland | H04L 67/34 |
| 2020/0244740 A1 | 7/2020 | Ko | |
| 2022/0236999 A1* | 7/2022 | Bhosle | G06F 9/44505 |
| 2023/0306042 A1 | 9/2023 | Liu | |

FOREIGN PATENT DOCUMENTS

| | | |
|---|---|---|
| CN | 111177178 A | 5/2020 |
| CN | 111182051 A | 5/2020 |
| CN | 111201764 A | 5/2020 |
| CN | 113568743 A | 10/2021 |
| JP | 2008123191 A | 5/2008 |
| WO | 2021057387 A1 | 4/2021 |

OTHER PUBLICATIONS

China National Intellectual Property Administration (CNIPA) Office Action 1 for Application No. 202110834668.6 Jan. 7, 2025 12 Pages (including translation).

* cited by examiner

INTERNET OF THINGS DEVICE MANAGEMENT METHOD AND APPARATUS APPLIED TO EDGE COMPUTING PLATFORM, MEDIUM, AND ELECTRONIC DEVICE

CROSS-REFERENCES TO RELATED APPLICATIONS

This application is a continuation application of PCT Patent Application No. PCT/CN2022/104269, entitled "INTERNET OF THINGS DEVICE MANAGEMENT METHOD AND APPARATUS, MEDIUM, PROGRAM PRODUCT, AND ELECTRONIC DEVICE" and filed on Jul. 7, 2022, which claims priority to Chinese Patent Application No. 202110834668.6, entitled "MANAGEMENT METHOD AND APPARATUS FOR INTERNET OF THINGS DEVICE, MEDIUM, AND ELECTRONIC DEVICE" filed on Jul. 23, 2021, the entire contents of both of which are incorporated herein by reference.

FIELD OF THE TECHNOLOGY

The present disclosure relates to the field of computers and communication technologies, and specifically, to a management method and apparatus for an Internet of Things device, a medium, a program product, and an electronic device.

BACKGROUND OF THE DISCLOSURE

Internet of Things (IoT) means that any object is connected to a network according to an agreed protocol by using an information sensing device, and information exchange and communication are performed by the object by using an information transmission medium, so as to implement functions such as intelligent identification, positioning, tracking, and supervision. In a related technology, control of an Internet of Things device is usually performed by a control end (for example, a smartphone), that is, the control end is connected to the controlled Internet of Things device, and the control end transmits a control instruction to the controlled Internet of Things device. However, it is difficult for this solution to meet an application scenario of massive Internet of Things devices.

SUMMARY

Embodiments of the present disclosure provide a management method and apparatus for an Internet of Things device, a medium, a program product, and an electronic device, so as to help implement decoupling between an Internet of Things device and a control end of the Internet of Things device, save transmission resources on the Internet of Things device, improve data transmission efficiency, and improve management efficiency of the Internet of Things device.

Other features and advantages of the present disclosure become obvious through the following detailed descriptions or partially learned through the practice of the present disclosure.

According to an aspect of the embodiments of the present disclosure, a management method for an Internet of Things device is provided, where the method is performed by an edge computing platform communicatively connected to the Internet of Things device, and the management method includes: generating a reported value storage space and a desired value storage space for the Internet of Things device; receiving device actual configuration data reported by the Internet of Things device, and storing the device actual configuration data into the reported value storage space; receiving a configuration instruction that is transmitted by a control end of the Internet of Things device and that includes desired configuration data, and storing the desired configuration data into the desired value storage space; and synchronizing the desired configuration data stored in the desired value storage space into the Internet of Things device when the desired configuration data stored in the desired value storage space is different from the device actual configuration data stored in the reported value storage space.

According to an aspect of the embodiments of the present disclosure, a management apparatus for an Internet of Things device is provided, where the management apparatus is disposed in an edge computing platform communicatively connected to the Internet of Things device, and the management apparatus includes: a generation unit, configured to generate a reported value storage space and a desired value storage space for the Internet of Things device; a first receiving unit, configured to receive device actual configuration data reported by the Internet of Things device, and store the device actual configuration data into the reported value storage space; a second receiving unit, configured to receive a configuration instruction that is transmitted by a control end of the Internet of Things device and that includes desired configuration data, and store the desired configuration data into the desired value storage space; and a first processing unit, configured to: synchronize the desired configuration data stored in the desired value storage space into the Internet of Things device when the desired configuration data stored in the desired value storage space is different from the device actual configuration data stored in the reported value storage space.

According to an aspect of the embodiments of the present disclosure, a non-transitory computer readable medium is provided, storing a computer program, the computer program, when executed by a processor, implementing the management method for an Internet of Things device according to the foregoing embodiment.

According to an aspect of the embodiments of the present disclosure, an electronic device is provided, including: one or more processors; and a storage apparatus, configured to store one or more programs, when executed by the one or more processors, causing the one or more processors to implement the management method for an Internet of Things device according to the foregoing embodiment.

BRIEF DESCRIPTION OF THE DRAWINGS

The accompanying drawings herein are incorporated into the specification and constitute a part of the specification, illustrate embodiments that conform to the present disclosure, and are used together with the specification to explain the principles of the present disclosure. Apparently, the accompanying drawings described below are merely some embodiments of the present disclosure, and a person of ordinary skill in the art may further obtain other accompanying drawings according to the accompanying drawings without creative efforts. In the accompanying drawings.

DESCRIPTION OF EMBODIMENTS

Example implementations are now described in a more comprehensive manner with reference to the accompanying drawings. However, the example implementations can be implemented in various forms and are not to be construed as limited to these examples. On the contrary, the purpose of providing these implementations is to make the present disclosure more comprehensive and complete, and convey the concept of the example implementations to a person skilled in the art in a comprehensive manner.

In addition, the described features, structures or characteristics in the present disclosure may be combined in one or more embodiments in any appropriate manner. The following description has many specific details, so that the embodiments of the present disclosure can be fully understood. However, a person skilled in the art is to realize that during implementing of the technical solutions of the present disclosure, not all the detailed features in the embodiments may be required, and one or more specific details may be omitted, or another method, element, apparatus, step, or the like may be used.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

"Plurality of" mentioned in the specification means two or more. "And/or" describes an association relationship of an associated object, indicating that three relationships may exist. For example, A and/or B may indicate three cases: A exists alone, both A and B exist, and B exist alone. The character "/" generally indicates an "or" relationship between associated objects before and after the character.

In Internet of Things, various apparatuses and technologies such as information sensors, radio frequency identification technologies, global positioning systems, infrared sensors, and laser scanners may be used for implementing ubiquitous connection between objects and between objects and people, and implementing intelligent perception, identification, and management of objects and processes. Internet of Things is an information carrier according to the Internet, telecommunication network, etc. It enables all ordinary physical objects that can be independently addressed to form an interconnected network.

Figure 1:
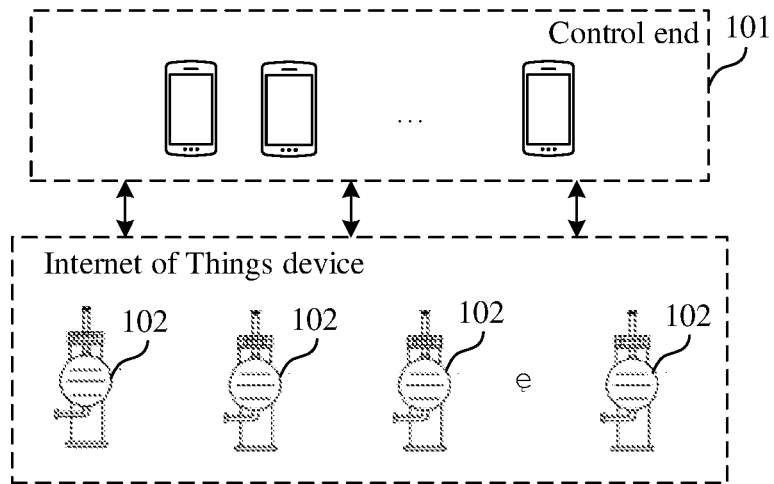
FIG. 1 is a schematic diagram of an Internet of Things control architecture.

As shown in FIG. 1, in an Internet of Things control architecture, a control end 101 directly communicates with an Internet of Things device 102 (for example, connected by using Bluetooth, or connected by using a Wi-Fi network or a mobile communication network), that is, strong binding is performed between the control end 101 and the Internet of Things device 102, and the control end 101 directly queries and modifies device data in the Internet of Things device 102. However, in this manner, in a scenario of massive Internet of Things devices, if there is a large quantity of frequent device query and modification instructions, not only a case of packet loss (for example, packet loss of a query instruction, a modification instruction, and device data) is caused, but also excessive device resources are consumed. In addition, when the Internet of Things device is offline (that is, when the Internet of Things device 102 is disconnected from the control end 101), the control end 101 cannot query and modify data in the Internet of Things device 102.

Figure 2:
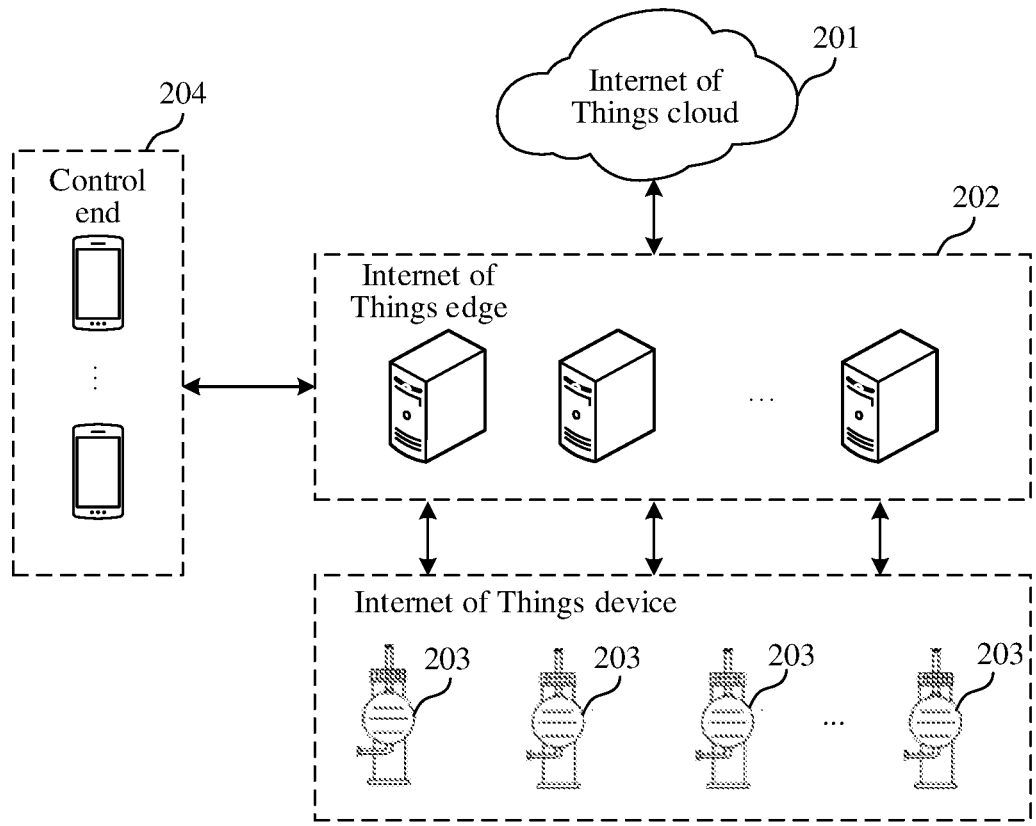
FIG. 2 is a schematic diagram of an Internet of Things system architecture according to an embodiment of the present disclosure.

Based on the foregoing problem, as shown in FIG. 2, an Internet of Things architecture in this embodiment of the present disclosure mainly includes: an Internet of Things cloud 201, an Internet of Things edge 202, and an Internet of Things device 203.

The Internet of Things cloud 201 mainly implements management on an Internet of Things device by using a cloud technology, so as to implement an application scenario of a cloud Internet of Things (Cloud IOT). Specifically, the cloud Internet of Things is designed to access, to the Internet, information sensed by a sensing device and an instruction received by the sensor device in Internet of Things, truly implement networking, and implement massive data storage and computing by using a cloud computing technology. Because a feature of the Internet of Things is that things are connected to things, and a current running status of each "object" is perceived in real time, a large amount of data information is generated in this process. How to summarize the information, and how to select useful information from the massive information to make decision support for subsequent development have become key problems that affect the development of the Internet of Things, and therefore, the cloud of the Internet of Things based on the cloud computing and the cloud storage technology becomes powerful support for the Internet of Things technology and the application.

The Internet of Things edge 202 may include one or more edge computing servers (also referred to as edge computing platforms, that is, Multi-Access Edge Computing). The edge computing server may be an independent physical server, or may be a server cluster formed by a plurality of physical servers or a distributed system, or may be a cloud server that provides a cloud computing service, or the like. A single edge computing server may connect to and control one or more Internet of Things devices 203. Compared with the Internet of Things cloud 201, the Internet of Things edge 202 is closer to the Internet of Things device 203. Therefore, data can be processed and analyzed more quickly, and linkage control can be implemented in real time.

Communication may be performed between the Internet of Things edge 202 and the Internet of Things cloud 201. For example, the Internet of Things edge 202 may process, based on a specified processing policy, device data reported by the Internet of Things device 203, and after processing is completed, may feed back important data to the Internet of Things cloud 201. The specified processing policy may be provided by the Internet of Things cloud 201 to the Internet of Things edge 202. Specifically, the Internet of Things cloud 201 may be responsible for an artificial intelligence (AI) algorithm, big data analysis, and rule parameter configuration. After training and upgrading of a model (such as a data processing model or a data analysis model) by the Internet of Things cloud 201, a model parameter may be transmitted to the Internet of Things edge 202, so as to optimize a service of the Internet of Things edge 202.

AI mentioned above involves a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, machine learning (ML)/deep learning, automated driving, and intelligent transportation.

Continuing to refer to FIG. 2, the Internet of Things edge 202 may periodically transmit device data to the Internet of Things cloud 201, and may support resumable data transfer with the Internet of Things cloud 201, to ensure data consistency with the Internet of Things cloud 201. The Internet of Things cloud 201 may control infrastructure resources for calculation, storage, network, and virtualization of the Internet of Things edge 202, dynamically adjust database infrastructure resources of the Internet of Things edge 202 according to reported monitoring data such as CPUs, memories, and networks, and execute a cloud resource scheduling management policy. In addition, the Internet of Things cloud 201 may also implement management and control on the Internet of Things device 203 by delivering a control instruction.

The Internet of Things device 203 is mainly configured to: collect Internet of Things data, and upload the collected data to the Internet of Things edge 202. The Internet of Things device 203 may be a sensor (for example: an ambient temperature sensor, an ambient humidity sensor, a gas concentration sensor, and the like), or may be a terminal device of a user. The terminal device may be a smartphone, a tablet computer, a notebook computer, a desktop computer, a smart speaker, a smartwatch, or the like, but is not limited thereto.

In addition, the Internet of Things architecture shown in FIG. 2 may further include a control end 204. The control end 204 is communicatively connected to the Internet of Things edge 202, and is configured to control the Internet of Things device 203 by using the Internet of Things edge 202, for example, query and modify device data.

In an embodiment of the present disclosure, the Internet of Things edge 202 may generate a reported value storage space and a desired value storage space for the Internet of Things device 203, where the reported value storage space is used for storing device actual configuration data reported by the Internet of Things device 203, and the desired value storage space is used for storing device desired configuration data transmitted by the control end 204.

After receiving the device actual configuration data reported by the Internet of Things device 203, the Internet of Things edge 202 stores the device actual configuration data into the reported value storage space. After receiving a configuration instruction that is transmitted by the control end 204 and that includes desired configuration data, the Internet of Things edge 202 stores, into the desired value storage space, the desired configuration data included in the configuration instruction. Then, the Internet of Things edge 202 compares the desired configuration data stored in the desired value storage space with the device actual configuration data stored in the reported value storage space. If the desired configuration data stored in the desired value storage space is different from the device actual configuration data stored in the reported value storage space, the desired configuration data stored in the desired value storage space is synchronized to the Internet of Things device 203. It can be learned that, in this embodiment of the present disclosure, an edge computing platform is introduced, on the one hand, device actual configuration data reported by an Internet of Things device can be received, on the other hand, desired configuration data transmitted by a control end of the Internet of Things device can be received, and data synchronization processing is implemented between the Internet of Things device and the control end. In this way, in this embodiment of the present disclosure, decoupling between an Internet of Things device and a control end of the Internet of Things device is implemented, so that even if the Internet of Things device is offline, the control end can still transmit a configuration instruction, and after the Internet of Things device is online, an edge computing platform synchronizes desired configuration data in a configuration instruction to the Internet of Things device in a timely manner. In addition, problems of packet loss and excessive transmission resources consumed on the Internet of Things device that may occur due to frequent interaction between the control end and the Internet of Things device can also be resolved, which helps improve management efficiency of the Internet of Things device. In other words, in this embodiment of the present disclosure, transmission resources on the Internet of Things device can be saved, data transmission efficiency can be improved, and management efficiency of the Internet of Things device can be improved.

Figure 3:
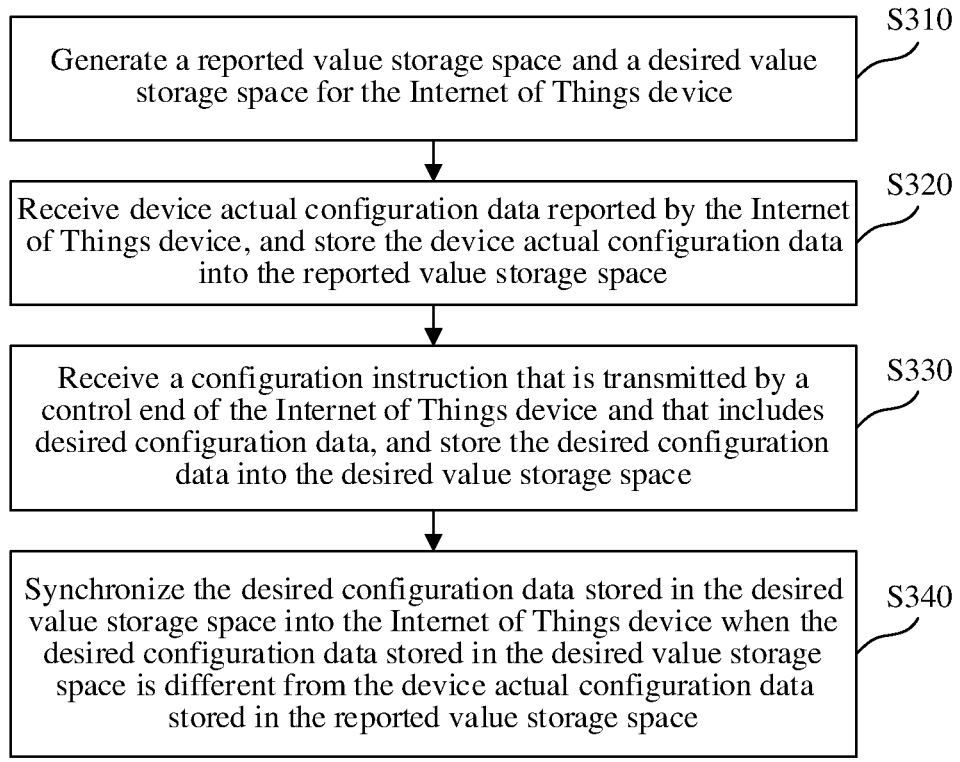
FIG. 3 is a flowchart of a management method for an Internet of Things device according to an embodiment of the present disclosure.

The implementation details of the technical solution of this embodiment of the present disclosure are described in detail in the following:

FIG. 3 is a flowchart of a management method for an Internet of Things device according to an embodiment of the present disclosure. The management method for the Internet of Things device may be performed by an edge computing platform, the edge computing platform is communicatively connected to the Internet of Things device, and the edge computing platform may be an edge server in the Internet of Things edge 202 shown in FIG. 2. Referring to FIG. 3, the management method of the Internet of Things device includes at least step S310 to step S340. Details are described as follows:

Step S310: Generate a reported value storage space and a desired value storage space for the Internet of Things device.

In an embodiment of the present disclosure, the reported value storage space is a data structure used for storing a reported value, and the reported value is device actual configuration data that is reported by the Internet of Things device to the edge computing platform, for example, an air pressure value in a natural gas pipeline and a current adjustment temperature of an air conditioner.

Similarly, the desired value storage space is a data structure used for storing a desired value, and the desired value is desired configuration data that is transmitted by the control end of the Internet of Things device to the edge computing platform, for example, an air pressure adjustment value in a natural gas pipeline and a target temperature set for an air conditioner.

Step S320: Receive device actual configuration data reported by the Internet of Things device, and store the device actual configuration data into the reported value storage space.

In an embodiment, the Internet of Things device and the edge computing platform may be connected in a wired communication manner or a wireless communication manner. If the Internet of Things device is connected to the edge computing platform in the wired communication manner, when reporting the device actual configuration data, the Internet of Things device may report the device actual configuration data to the edge computing platform in the wired communication manner. If the Internet of Things device is connected to the edge computing platform in the wireless communication manner, when reporting the device actual configuration data, the Internet of Things device may report the device actual configuration data to the edge computing platform in the wireless communication manner.

In an embodiment of the present disclosure, in a process in which the edge computing platform receives the device actual configuration data reported by the Internet of Things device for a plurality of times, the edge computing platform may replace existing device actual configuration data in the reported value storage space by using newly received device actual configuration data. Alternatively, the device actual configuration data reported by the Internet of Things device for a plurality of times may be stored in the reported value storage space according to a time sequence.

Step S330: Receive a configuration instruction that is transmitted by a control end of the Internet of Things device and that includes desired configuration data, and store the desired configuration data into the desired value storage space.

In an embodiment, the control end of the Internet of Things device may be connected to the edge computing platform in a wired communication manner or a wireless communication manner. If the control end of the Internet of Things device is connected to the edge computing platform in the wired communication manner, when reporting the desired configuration data, the control end of the Internet of Things device may report the desired configuration data to the edge computing platform in the wired communication manner. If the control end of the Internet of Things device is connected to the edge computing platform in the wireless communication manner, when reporting the desired configuration data, the control end of the Internet of Things device may report the desired configuration data to the edge computing platform in the wireless communication manner.

In an embodiment of the present disclosure, in a process of receiving configuration instructions transmitted by the control end for a plurality of times, the edge computing platform may replace existing desired configuration data in the desired value storage space with desired configuration data in newly received configuration instruction. Alternatively, desired configuration data transmitted by the control end for a plurality of times may be stored in the desired value storage space according to a time sequence.

There is no absolute sequence between step S330 and step S320, and step S320 may be performed first and then step S330 is performed. Alternatively, step S330 may be performed first and then step S320 is performed. Alternatively, step S320 and step S330 may be simultaneously performed.

Step S340: Synchronize the desired configuration data stored in the desired value storage space into the Internet of Things device when the desired configuration data stored in the desired value storage space is different from the device actual configuration data stored in the reported value storage space.

In an embodiment of the present disclosure, if the desired configuration data stored in the desired value storage space is different from the device actual configuration data stored in the reported value storage space, when it is detected that the Internet of Things device is in an online state, the desired configuration data stored in the desired value storage space may be synchronized to the Internet of Things device.

In an embodiment of the present disclosure, if the desired configuration data stored in the desired value storage space is different from the device actual configuration data stored in the reported value storage space, when it is detected that the Internet of Things device is in an offline state, a network status of the Internet of Things device may continue to be detected, until it is detected that the Internet of Things device switches from the offline state to the online state, and the desired configuration data stored in the desired value storage space is synchronized to the Internet of Things device.

In an embodiment, in a process in which the Internet of Things device is in the offline state, in response to the edge computing platform receiving configuration instructions transmitted by the control end for a plurality of times, after it is detected that the Internet of Things device switches from the offline state to the online state, desired configuration data that is stored in the desired value storage space and that is last received (that is, latest received desired configuration data in the plurality of times) is synchronized to the Internet of Things device. In this way, it can be ensured that the desired configuration data synchronized to the Internet of Things device is latest configuration data.

In an embodiment of the present disclosure, because the Internet of Things device does not report device actual configuration data of its own to the edge computing platform in the offline state, a case in which the actual configuration data of the Internet of Things device is inconsistent with desired configuration data transmitted by the control end may further occur. Therefore, when detecting that the Internet of Things device changes from the offline state to the online state, the edge computing platform may first obtain latest device actual configuration data reported by the Internet of Things device. If the latest device actual configuration data is different from the desired configuration data stored in the desired value storage space, the desired configuration data stored in the desired value storage space is synchronized to the Internet of Things device.

In an embodiment of the present disclosure, if the edge computing platform receives a device configuration query request transmitted by the control end of the Internet of Things device, the edge computing platform may obtain the latest device actual configuration data reported by the Internet of Things device from the reported value storage space, and then return the obtained latest device actual configuration data reported by the Internet of Things device to the control end.

It can be learned that the technical solution in this embodiment of the present disclosure introduces an edge computing platform. On the one hand, device actual configuration data reported by an Internet of Things device may be received, and on the other hand, desired configuration data transmitted by a control end of the Internet of Things device may be received, and data synchronization processing is implemented between the Internet of Things device and the control end, thereby implementing decoupling between the Internet of Things device and the control end, so that even if the Internet of Things device is offline, the control end can still transmit a configuration instruction, and after the Internet of Things device is online, an edge computing platform synchronizes desired configuration data in a configuration instruction to the Internet of Things device in a timely manner. In addition, problems of packet loss and excessive transmission resources consumed on the Internet of Things device that may occur due to frequent interaction between the control end and the Internet of Things device can also be resolved, which helps improve management efficiency of the Internet of Things device.

Figure 4:
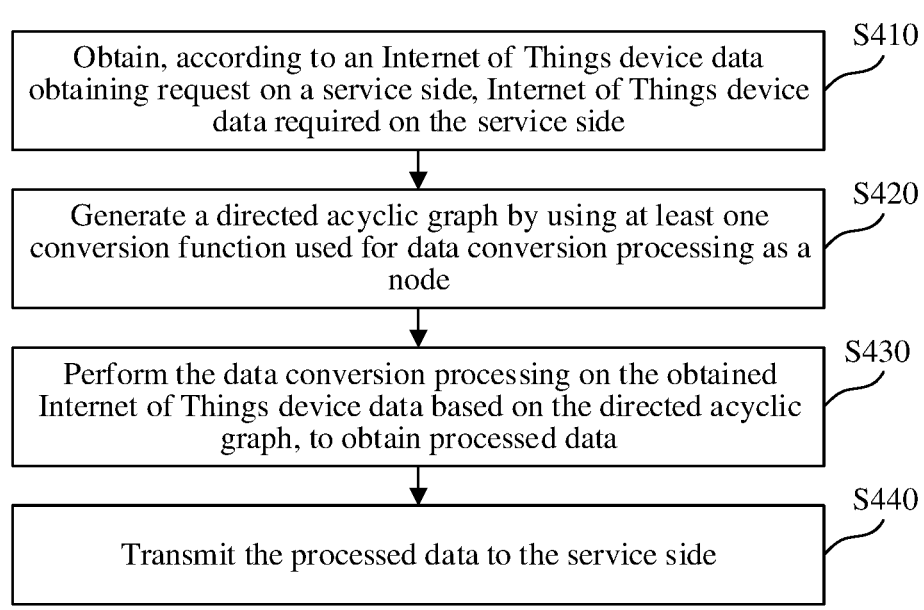
FIG. 4 is a flowchart of a management method for an Internet of Things device according to an embodiment of the present disclosure.

FIG. 4 is a flowchart of a management method for an Internet of Things device according to an embodiment of the present disclosure. The management method for the Internet of Things device may be performed by an edge computing platform, the edge computing platform is communicatively connected to the Internet of Things device, and the edge computing platform may be an edge server in the Internet of Things edge 202 shown in FIG. 2. Referring to FIG. 4, the management method of the Internet of Things device includes at least step S410 to step S440. Details are described as follows:

Step S410: Obtain, according to an Internet of Things device data obtaining request on a service side, Internet of Things device data required on the service side.

In an embodiment of the present disclosure, the service side is a consumer of Internet of Things device data, for example, data analysis and linkage control are performed according to data of a plurality of Internet of Things devices.

If the Internet of Things device data obtaining request on the service side is to obtain data (that is, data uploaded most recently) uploaded by a specified Internet of Things device this time, the data uploaded by the Internet of Things device this time is obtained; and if the Internet of Things device data obtaining request on the service side is to obtain data that is uploaded by a specified Internet of Things device this time and that has been persisted, the data that is uploaded by the Internet of Things device this time and that has been persisted in a database may be obtained.

Step S420: Generate a directed acyclic graph by using at least one conversion function used for data conversion processing as a node.

In an embodiment, the conversion function may include a normalization function, a sorting function, a clustering function, and the like. An input to one conversion function is an output of one previous conversion function or several previous conversion functions. Therefore, execution topology diagrams of these conversion functions may be described by using a directed acyclic graph (DAG), that is, the DAG does not form a ring along a direction (from a start node to an end node), and the input to the conversion function does not depend on function data at the downstream of the DAG, that is, no loop occurs.

Step S430: Perform the data conversion processing on the obtained Internet of Things device data based on the directed acyclic graph, to obtain processed data.

In an embodiment, the performing the data conversion processing on the obtained Internet of Things device data based on the directed acyclic graph is data conversion processing performed on the Internet of Things device data successively by using at least one conversion function that forms the directed acyclic graph. For example, signal conversion, quantitative conversion, threshold filtering, correction, low-pass filtering, interpolation, and function processing of an empirical formula are sequentially performed on obtained temperature data.

Step S440: Transmit the processed data to the service side.

The technical solution in the embodiment shown in FIG. 4 enables establishment of a pipeline of data processing based on a directed acyclic graph, thereby improving standardization and processing efficiency of data processing of an Internet of Things device.

Figure 5:
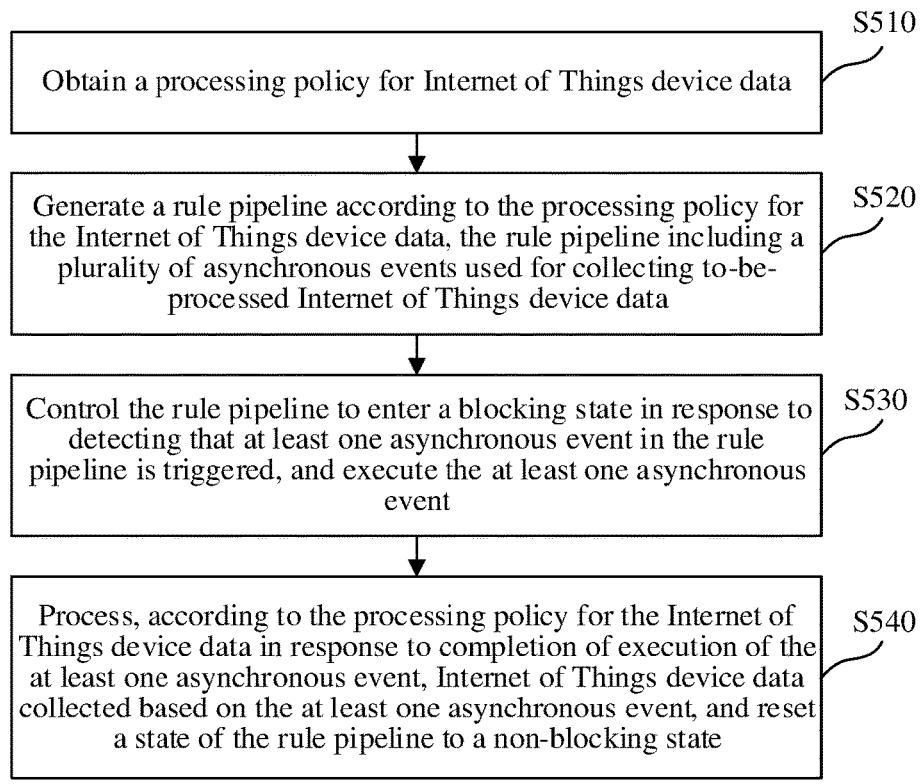
FIG. 5 is a flowchart of a management method for an Internet of Things device according to an embodiment of the present disclosure.

FIG. 5 is a flowchart of a management method for an Internet of Things device according to an embodiment of the present disclosure. The management method for the Internet of Things device may be performed by an edge computing platform, the edge computing platform is communicatively connected to the Internet of Things device, and the edge computing platform may be an edge server in the Internet of Things edge 202 shown in FIG. 2. Referring to FIG. 5, the management method of the Internet of Things device includes at least step S510 to step S540. Details are described as follows:

Step S510: Obtain a processing policy for Internet of Things device data.

In an embodiment of the present disclosure, the processing policy for the Internet of Things device data may be delivered by an Internet of Things cloud, or may be preset inside the edge computing platform.

Step S520: Generate a rule pipeline according to the processing policy for the Internet of Things device data, the rule pipeline including a plurality of asynchronous events used for collecting to-be-processed Internet of Things device data.

In this embodiment of the present disclosure, the rule pipeline includes a plurality of asynchronous events. In other words, a rule pipeline is a set of a plurality of asynchronous events. The events may be divided into a simple event and a group event, and the simple event is an atomic event that cannot be continuously divided. The group event includes a plurality of simple events, and both the simple event and the group event correspond to corresponding routines. The routine stores data uploaded by the Internet of Things device. One simple event corresponds to one routine, and one group event is corresponding to a plurality of routines. A routine is, for example, a lightweight thread of an operating system. An asynchronous event is an event executed asynchronously. A routine corresponding to the asynchronous event is executed asynchronously.

Step S530: Control the rule pipeline to enter a blocking state in response to detecting that at least one asynchronous event in the rule pipeline is triggered, and execute the at least one asynchronous event.

In an embodiment, the controlling the rule pipeline to enter a blocking state may be controlling the rule pipeline to perform input/output (I/O) blocking.

In an embodiment of the present disclosure, an asynchronous event includes at least one routine, and a routine is used for collecting Internet of Things device data. When the asynchronous event is executed, an asynchronous event in the at least one asynchronous event may be controlled to enter the blocking state, and Internet of Things device data is collected by using a routine included in the asynchronous event. In response to detecting that the routine included in the asynchronous event in the at least one asynchronous event completes collection of the Internet of Things device data, it is determined that execution of the asynchronous event is completed. In some embodiments, the above procedure may be performed for each asynchronous event of the at least one asynchronous event.

Step S540: Process, according to the processing policy for the Internet of Things device data in response to completion of execution of the at least one asynchronous event, Internet of Things device data collected based on the at least one asynchronous event, and reset a state of the rule pipeline to a non-blocking state. That is, the rule pipeline is controlled to enter the non-blocking state. Entering the non-blocking state is, for example, enabling the rule pipeline to enter an I/O non-blocking state.

According to the technical solution of the embodiment shown in FIG. 5, data processing in an Internet of Things scenario may be implemented in a rule pipeline manner.

Based on the Internet of Things application scenario in this embodiment of the present disclosure, in an embodiment of the present disclosure, the edge computing platform may further receive a data processing policy transmitted by an Internet of Things cloud, then process obtained Internet of Things device data according to the data processing policy, to obtain a data processing result, and then report the data processing result to the Internet of Things cloud.

In addition, in an embodiment of the present disclosure, the edge computing platform may further receive a device control instruction transmitted by the Internet of Things cloud, and control, according to the device control instruction, the Internet of Things device managed by the edge computing platform. In addition, the edge computing platform may further receive a resource control instruction transmitted by the Internet of Things cloud, and adjust, according to the resource control instruction, a resource used by the edge computing platform to manage the Internet of Things device, such as a CPU resource, a memory resource, and a network resource.

With reference to the foregoing embodiment, the technical solution of the present disclosure mainly sinks a control plane from the cloud (that is, the Internet of Things cloud) to the edge (that is, the edge computing platform), so as to monitor and analyze the Internet of Things device data by using the edge, which not only reduces a delay, but also enhances a service collaboration capability. In addition, as a quantity of Internet of Things devices increases, a data amount of the Internet of Things devices continues to soar. A large quantity of invalid data is filtered by using the edge computing platform, and only valid data is transmitted to the Internet of Things cloud, thereby greatly improving network bandwidth efficiency and reducing network bandwidth costs. In addition, in terms of security and confidentiality of sensitive data, the edge computing platform collects and processes data in an edge area, and the sensitive data is stored in the edge area. Except the Internet of Things cloud, an access service is not opened to the outside. If the Internet of Things cloud is attacked by a network, a network of the edge computing platform is not paralyzed, linkage and control of the Internet of Things device by the edge computing platform are not affected, and an autonomy capability of the edge area is ensured.

Figure 6:
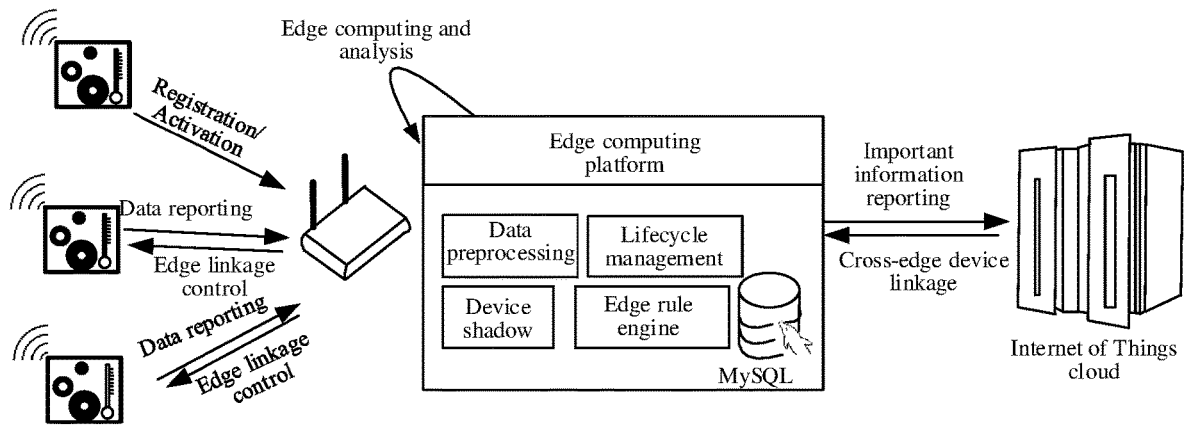
FIG. 6 is a schematic diagram of an Internet of Things architecture according to an embodiment of the present disclosure.

Specifically, as shown in FIG. 6, the Internet of Things device communicates with the edge computing platform, and the edge computing platform communicates with the Internet of Things cloud. The Internet of Things device performs a registration/activation operation on the edge computing platform, to implement management of the Internet of Things device by the edge computing platform. The Internet of Things device may report the Internet of Things device data to the edge computing platform, and the edge computing platform may perform edge linkage control on the Internet of Things device. The edge computing platform may perform data preprocessing (for example, data conversion processing) on the Internet of Things device data reported by the Internet of Things device, and may perform life cycle management (for example, registration, activation, and deregistration) on the Internet of Things device. In addition, the edge computing platform may further implement decoupling between the Internet of Things device and a control device of the Internet of Things device by using a device shadow, and may further process, by using an edge rule engine, data reported by the Internet of Things device. Herein, the device shadow is, for example, a storage structure corresponding to data stored in the desired value storage space and the reported value storage space. For example, the device shadow includes a reported value storage structure (Report Structure) and a desired value storage structure (Desired Structure). The reported value storage structure is configured to store latest data reported by a device, and the control end (for example, the control end may be an APP) stores data included in a control instruction for the Internet of Things device into the desired value storage structure. The edge rule engine may, for example, calculate data in a rule pipeline. After processing received Internet of Things device data, the edge computing platform may report important information to the Internet of Things cloud. In addition, the Internet of Things cloud may also implement, by using the edge computing platform, cross-edge computing platform control on the Internet of Things device.

In other words, by introducing the edge computing platform, the following functions may be implemented: Immediately monitoring and analyzing data: The edge computing platform may establish a data processing pipeline to preprocess data, and transmit the processed data to the edge rule engine, for example, trigger a rule to control a device, and transmit a result to the Internet of Things cloud, so as to reduce invalid data transmission. In terms of security authentication, access authentication and transport layer security (TLS) transmission are performed on an edge side, and the outside cannot directly access the edge computing platform and the Internet of Things device, thereby ensuring data security.

In a related technology, the control device communicates with the Internet of Things device. If the control device transmits a large quantity of control instructions to the Internet of Things device frequently, a packet loss problem occurs, and a resource of the device is consumed. If the Internet of Things device is not online, data of the Internet of Things device cannot be read, and data cannot be written to the Internet of Things device. Therefore, strong binding between the Internet of Things device and the control device can be decoupled by introducing the device shadow, which resolves problems of packet loss and excessive transmission resources consumed on the Internet of Things device due to frequent interaction between the control device and the Internet of Things device, and further helps improve management efficiency of the Internet of Things device.

In addition, rule calculation on the Internet of Things cloud is sunk to the edge computing platform, that is, a rule file is delivered by the Internet of Things cloud to an edge (that is, the edge computing platform), the edge runs the rule file, and device control is performed on the edge. When the Internet of Things cloud is disconnected from the edge, the edge may store historical data of the Internet of Things device, and ensure regional autonomy of the edge. After the edge is reconnected to the Internet of Things cloud, the edge uploads data to the cloud, to maintain data consistency and smooth a management channel.

The following describes in detail all aspects of the embodiments of the present disclosure.

Figure 7:
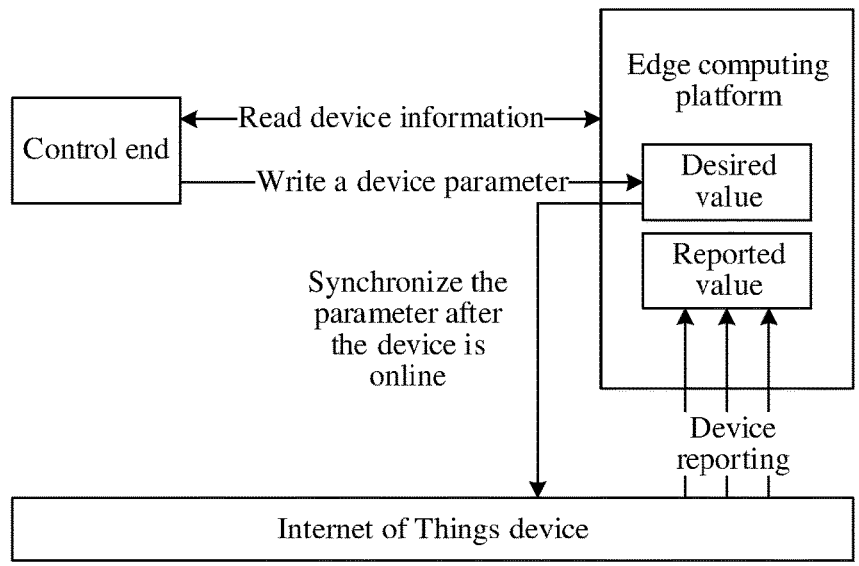
FIG. 7 is a schematic diagram of an interaction process among an edge computing platform, a control end, and an Internet of Things device according to an embodiment of the present disclosure.

In an embodiment of the present disclosure, as shown in FIG. 7, two storage structures are disposed on the edge computing platform, that is, a reported value storage structure (Report Structure) and a desired value storage structure (Desired Structure). The reported value storage structure is configured to store latest data reported by a device, and the control end (for example, the control end may be an APP) stores data included in a control instruction for the Internet of Things device into the desired value storage structure. When reporting data, the Internet of Things device updates the reported value, and compares whether the desired value is the same as the reported value. If the desired value is different from the reported value, the desired value is delivered to the Internet of Things device.

When the Internet of Things device is not online, if the control end transmits control instructions for a plurality of times, data included in the last control instruction is used. This design model of the device shadow enables data consistency among the control end, the Internet of Things device, and the edge computing platform.

In addition, the control end may be decoupled from the Internet of Things device. Specifically, a control end read device is decoupled, that is, when the control end needs to obtain information about the Internet of Things device, the control end does not need to directly transmit an instruction to the Internet of Things device, but may access a reported value data structure in the edge computing platform, so as to obtain the reported value of the device. If the Internet of Things device is offline or in a weak connected state, data stored in the reported value may not be the latest value of the device. When the device goes online or its network is restored, after the Internet of Things device reports an updated reported value, the reported value storage structure stores the latest value reported by the device.

A control end write device is decoupled, that is, when the control end needs to update the device configuration or control the device, the control end writes a control instruction to the desired value storage structure of the edge computing platform. After the write succeeds, if the device is online, the desired value is directly synchronized to the device, and if the device is offline, after the device reports data next time, the desired value is synchronized to the device.

Figure 8:
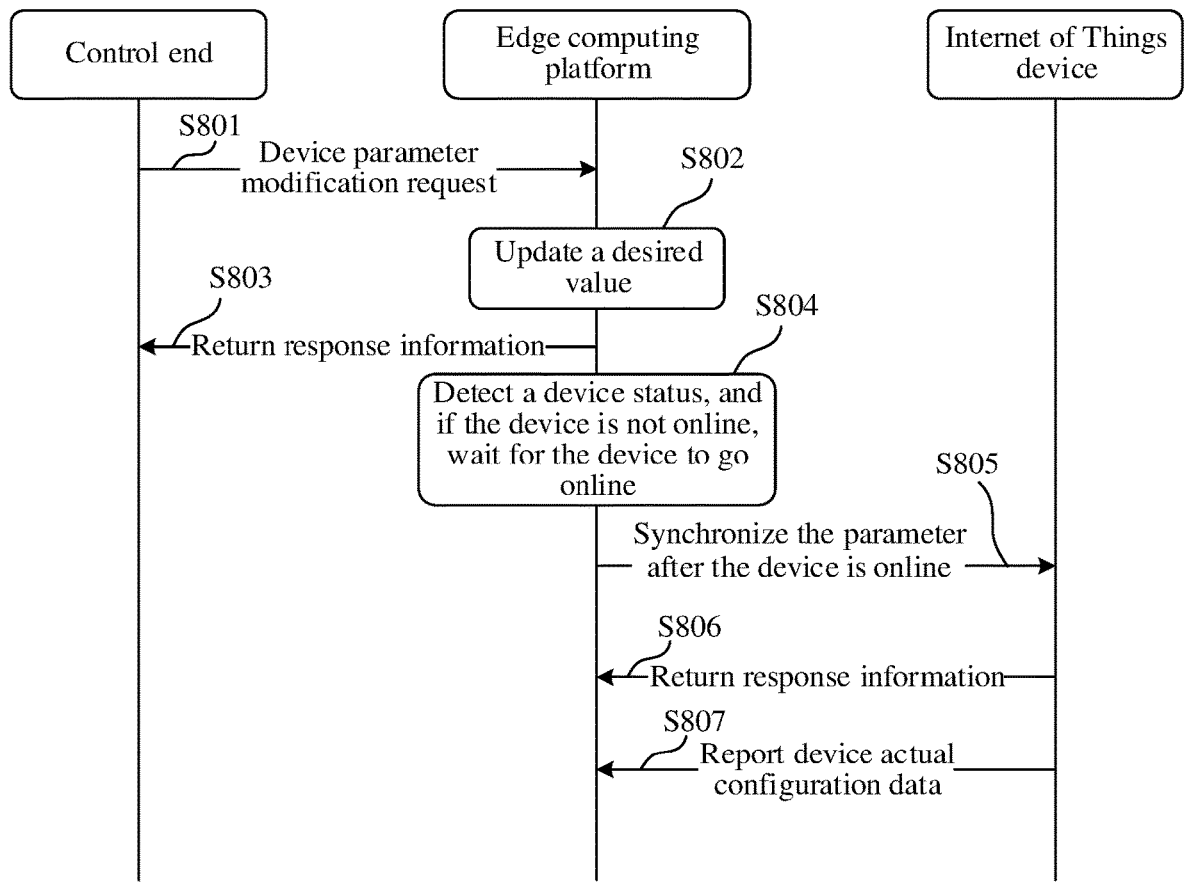
FIG. 8 is a schematic flowchart of interaction among an edge computing platform, a control end, and an Internet of Things device according to an embodiment of the present disclosure.

A specific processing procedure based on the device shadow is shown in FIG. 8 and includes the following steps:

Step S801: A control end transmits a device parameter modification request to an edge computing platform.

Step S802: The edge computing platform updates a desired value storage structure.

Step S803: The edge computing platform returns response information to the control end. Herein, the response information is a response message for the device parameter modification request, for example, may indicate that the desired value storage structure has been updated.

Step S804: The edge computing platform detects a device status, and if the device is not online, waits for the device to go online.

Step S805: When the device is online, the edge computing platform synchronizes a parameter to an Internet of Things device. Synchronizing the parameter is, for example, synchronizing the updated desired value in the desired value storage structure to the Internet of Things device.

Step S806: The Internet of Things device returns response information for synchronizing the parameter to the edge computing platform.

Step S807: The Internet of Things device reports device actual configuration data to the edge computing platform.

Figure 9:
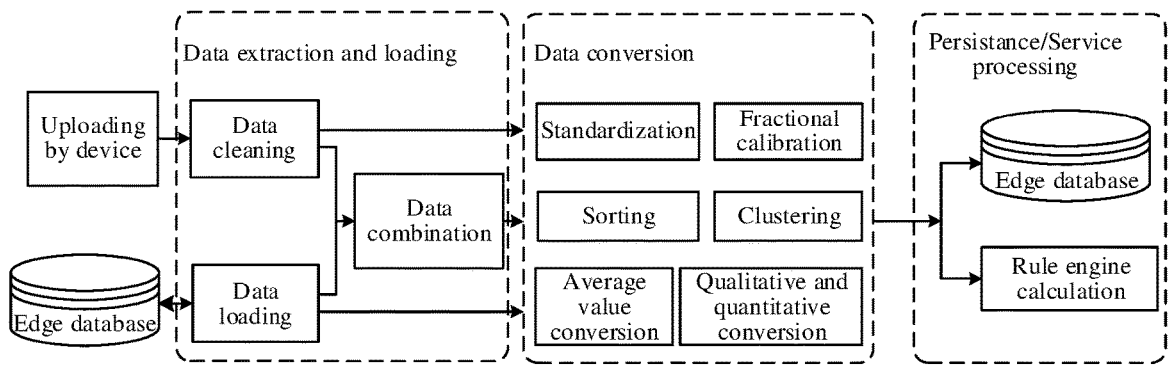
FIG. 9 shows a processing procedure of a data processing pipeline according to an embodiment of the present disclosure.

In an embodiment of the present disclosure, a process in which the edge computing platform processes the Internet of Things device data may be performed by using a data processing pipeline shown in FIG. 9. The Internet of Things device data mainly includes two manners: a continuous data stream and intermittent data. The data processing pipeline supports data preprocessing in both manners. Specifically, invalid data is filtered out through processes such as data extraction and loading, data conversion, and persistence to generate data that meets service specifications. The data processing pipeline provides a connection between a service processing end and heterogeneous devices (that is, various Internet of Things devices), and integrates distributed and non-uniform data.

Referring to FIG. 9, the data extraction and loading process is specifically as follows: When the Internet of Things device uploads data, data cleaning is performed at a temporary intermediate layer (that is, a component that executes the data extraction and loading process on the edge computing platform). When an upper-layer service only needs data uploaded this time, the upper-layer service directly accesses the data conversion process. When the upper-layer service simultaneously needs the data uploaded this time and other data that has been persisted (that is, data stored in an edge database), the edge database is loaded for querying, and data obtained from the edge database and the data uploaded this time are combined to enter the data conversion process. Certainly, if the upper-layer service only needs persisted data, the edge database may be loaded for querying, and then the data conversion process is directly entered according to data obtained from the edge database.

During data conversion, each conversion process consists of a function (for example, a normalization function, a sorting function, and a clustering function). An input to one function is an output of one previous function or several previous functions. A DAG may be used for describing an execution topology diagram of these functions. The DAG does not form a ring along a direction (from a start node to an end node), and the input to the function does not depend on function data at the downstream of the DAG, that is, no loop occurs. In the DAG diagram, each node is a function, and each edge represents data that is passed from one function to a next function.

Generally, there are four types of data structures in the DAG, which are respectively an error type (Error), an air interface slice ( . . . interface{ }), a DAG node (Node), and a DAG edge (Edge). The air interface (interface{ }) supports any data type, and " . . . " indicates a parameter that supports a variable quantity. The node is a high-order function (the function may be used as a parameter to pass into another function, or as a return value of another function), and executes data processing logic. Both input and output are of the edge data type. The edge is abstracted as a (Error, . . . interface{ }) data structure. A function decorator defines an execution process of the DAG, that is, node functions are executed from top to bottom in a topological order, and a final running result is outputted to a rule pipeline corresponding to an event processing rule, to trigger rule calculation.

Figure 10:
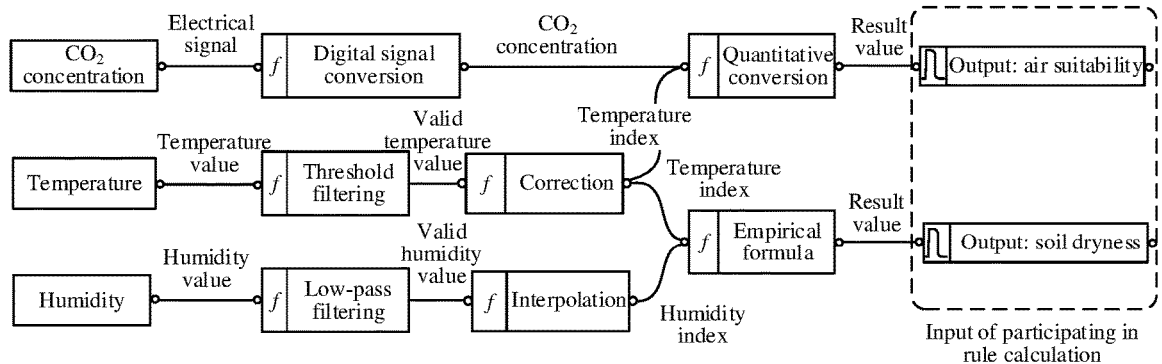
FIG. 10 shows a directed acyclic graph programmed in a functional programming paradigm in a data conversion process according to an embodiment of the present disclosure.

In a specific example, FIG. 10 shows a directed acyclic graph programmed in a functional programming paradigm in a data conversion process according to an embodiment of the present disclosure. In this embodiment, the Internet of Things device includes a CO2 sensor for monitoring a CO2 (carbon dioxide) concentration, a temperature sensor for monitoring an ambient temperature, and a humidity sensor for monitoring ambient humidity. After obtaining the data uploaded by the Internet of Things device, the edge computing platform correspondingly performs, according to the directed acyclic graph programmed by using the functional programming paradigm shown in FIG. 10, a series of functions such as signal conversion, quantitative conversion, threshold filtering, correction, low-pass filtering, interpolation, and function processing of an empirical formula, and then participates obtained output (air suitability degree and soil dryness degree), as an input to rule calculation, into calculation of a specific service rule.

For the persistence and service processing process, two operations are performed on the data obtained from the data conversion process concurrently. One is to write the data to the database for persistence. The other is to participate the data into service transfer and process the data according to an event processing rule.

The specification of the data processing pipeline in the foregoing embodiment may be preconfigured and delivered by the Internet of Things cloud, and the specification of the data processing pipeline includes an association relationship between a database table in the edge computing platform and the Internet of Things device, a data cleaning threshold rule, each conversion function, a data conversion DAG topology, and the like. Therefore, the edge computing platform may process, according to the specification of the data processing pipeline, the Internet of Things data received from the Internet of Things device.

After the Internet of Things cloud detects that the service of the edge computing platform is abnormal and cannot be recovered, the Internet of Things cloud may re-deliver a specification file of the data processing pipeline, and re-establish an edge computing platform instance. When the edge computing platform cannot communicate with the Internet of Things cloud due to a network fault, the edge computing platform can continue to provide a processing service of the data processing pipeline, to ensure that the data processing service of the edge computing platform is not interrupted.

In an embodiment of the present disclosure, a trigger problem in the edge rule engine shown in FIG. 6 may be resolved by using the rule pipeline and the asynchronous event. Specifically, one preset rule pipeline includes a plurality of events, and events are independently and asynchronously executed. If some events in the preset rule pipeline are triggered, I/O blocking is performed on the preset rule pipeline, and rule engine calculation is triggered after all events in the preset rule pipeline are triggered.

In an embodiment, the events include a simple event and a group event, the simple event is an atomic event that cannot be continuously segmented, and the group event includes a plurality of simple events. One simple event corresponds to one operating system routine, the group event corresponds to a plurality of routines, and each routine is responsible for receiving uploaded data (sensor data) of the Internet of Things device. The routine mainly refers to an operating system lightweight thread.

Figure 11:
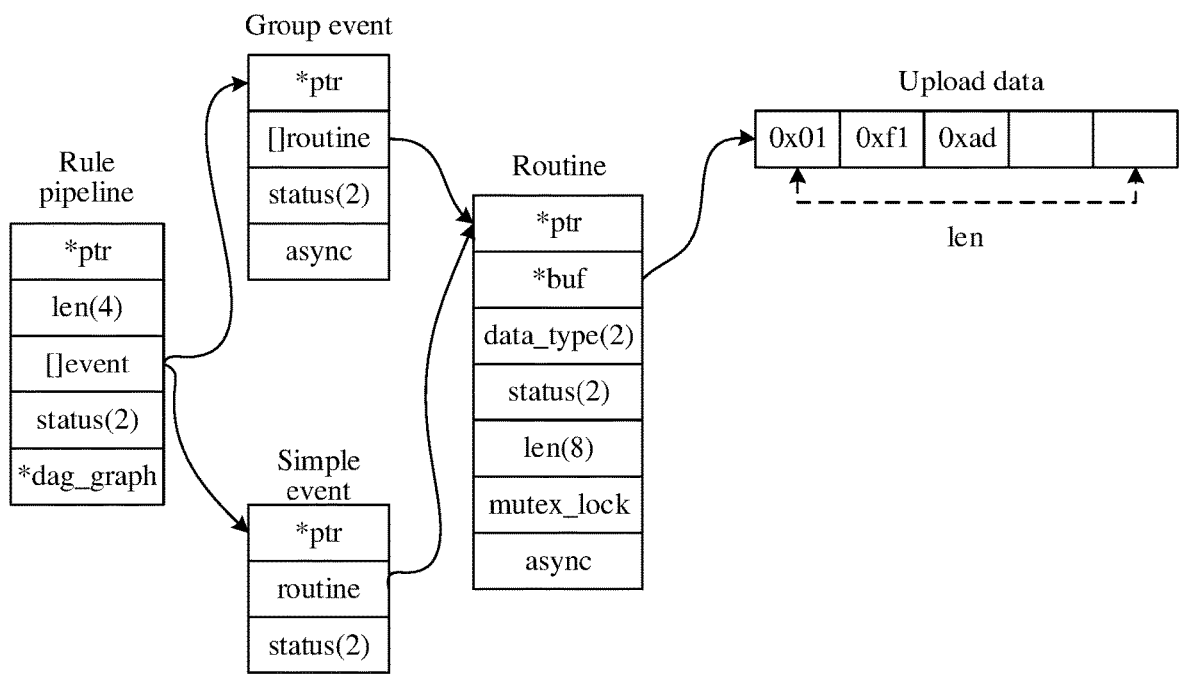
FIG. 11 is a schematic structural composition diagram of Internet of Things data at each service level according to an embodiment of the present disclosure.

Referring to FIG. 11, in a structure composition of Internet of Things data at each service level in an embodiment of the present disclosure, a rule pipeline includes events. The events may be divided into a simple event and a group event. Both the simple event and the group event correspond to corresponding routines, and the routine stores data uploaded by the Internet of Things device. Parameters such as len and status in the figure belong to specific data structure content in an underlying implementation, and therefore details are not described herein again.

When the Internet of Things device uploads the Internet of Things data to the edge computing platform, the Internet of Things data uploaded by the Internet of Things device is stored in a routine storage block after being processed, and the routine storage block triggers a message for an event of parent subscription. After receiving the message, an event in I/O blocking queries its status to check whether all routine storage blocks have completed data receiving and storage. If only some of the routine storage blocks complete data receiving and storage, I/O blocking continues. If all the routine storage blocks complete data receiving and storage, the event triggers a message for a rule pipeline of the parent subscription. After receiving the message, a rule pipeline in I/O blocking queries its status to check whether all events are completed. If some of all the events are completed, I/O blocking continues. If all the events are completed, rule calculation starts, and the rule pipeline is reset to wait for next triggering.

There is a many-to-many relationship between a preset rule pipeline and data, and data sources that participate in the preset rule pipeline mainly include device uploading and output from an edge database and a processing pipeline. An Internet of Things service in a complex scenario is analyzed, and all rules can be disassembled into three types: a device uploading mode, an edge database mode, and a combined data mode.

Device uploading mode: The preset rule pipeline subscribes to a simple event. When the Internet of Things device uploads data, the event transparently transmits the Internet of Things device data to the preset rule pipeline, and triggers rule calculation.

Edge database mode: The preset rule pipeline subscribes to a simple event. When the Internet of Things device uploads data, the event queries the edge database, and outputs a queried data result to the preset rule pipeline, to trigger rule calculation.

Combined data mode: The preset rule pipeline subscribes to a group event. When one Internet of Things device uploads data, it is checked whether all data required for the group event is filled. If the filling is not completed, I/O blocking is performed. If the filling is completed, the group event transmits data to the preset rule pipeline to trigger rule calculation.

Figure 12:
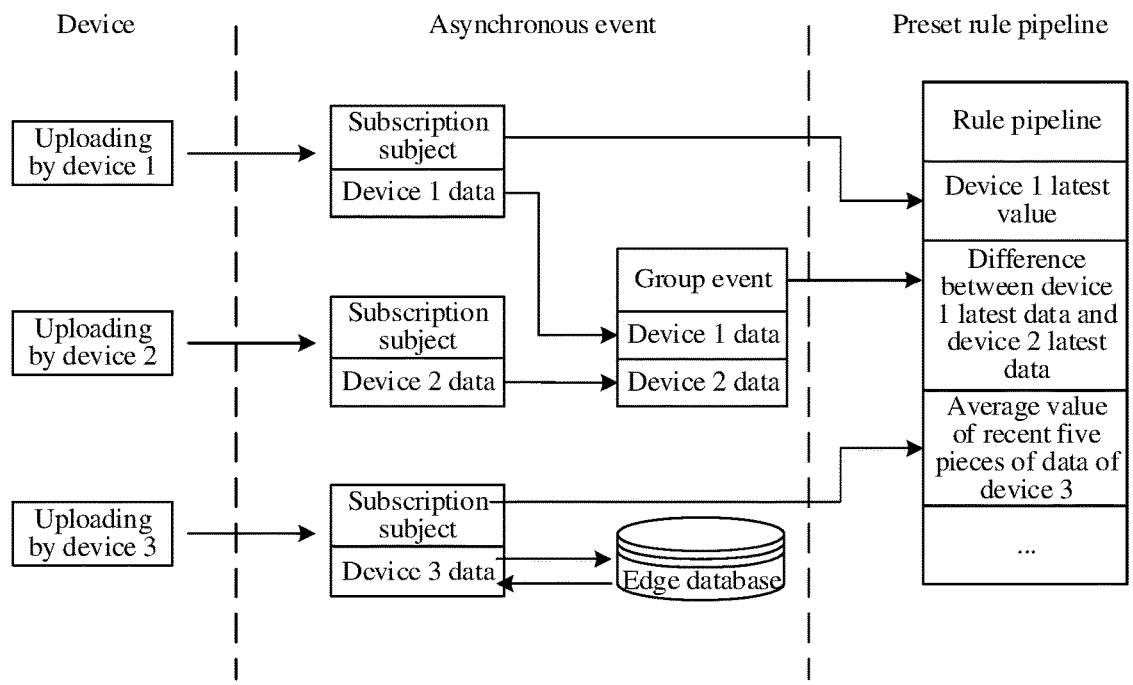
FIG. 12 is a schematic structural composition diagram of a rule pipeline corresponding to an event processing rule according to an embodiment of the present disclosure.

Referring to FIG. 12, in a structure composition of a rule pipeline corresponding to an event processing rule in an embodiment of the present disclosure, the rule pipeline is corresponding to a plurality of asynchronous events. Among these plurality of asynchronous events, there are simple events such as an event corresponding to device 1 data and an event corresponding to device 3 data; and there are also composite events such as an event obtained by combining the event corresponding to device 1 data and an event corresponding to device 2 data. Correspondingly, each simple event corresponds to one Internet of Things device.

Specifically, device 1 uploads its collected device 1 data, and triggers a corresponding simple event 1; device 2 uploads its collected device 2 data, and triggers a corresponding simple event 2; and device 3 uploads its collected device 3 data, and triggers a corresponding simple event 3. When both the simple event 1 and the simple event 2 are triggered, a group event corresponding to device 1 data and device 2 data is triggered. Device 3 data further needs to be persisted and stored in the edge database.

The simple event 1 corresponds to an event related to the "device 1 latest value" in the rule pipeline. The group event corresponds to an event related to a "difference between device 1 latest data and device 2 latest data" in the rule pipeline. The simple event 3 corresponds to an event related to an "average value of recent five pieces of data of device 3" in the rule pipeline.

If an untriggered event exists in the rule pipeline, I/O blocking is performed. When all events in the rule pipeline are triggered, I/O blocking is released, and the rule pipeline is triggered to process all the events in the pipeline according to a corresponding processing rule.

Figure 13:
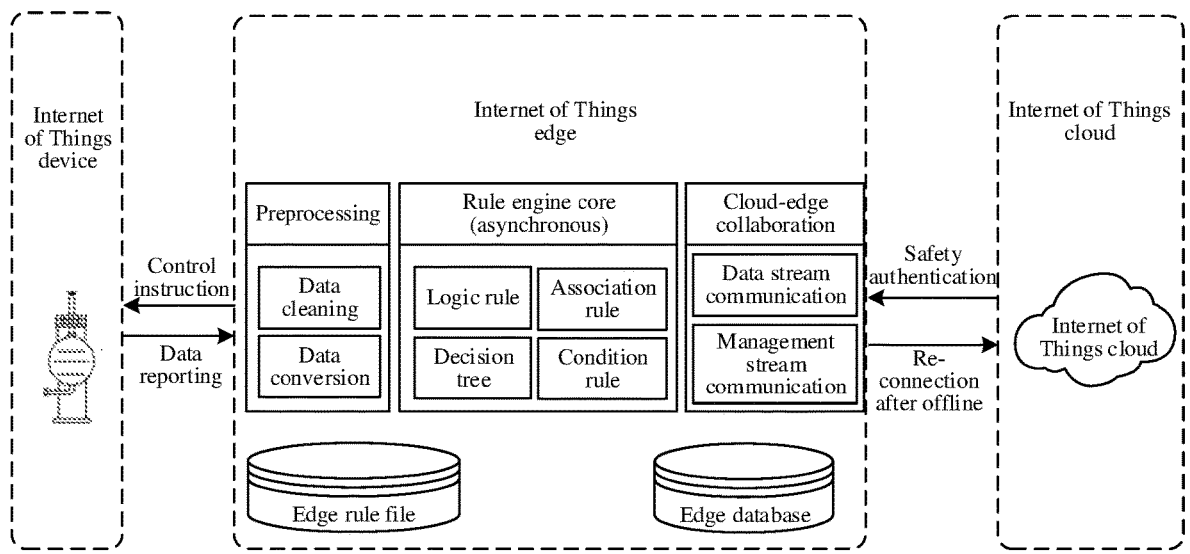
FIG. 13 is a schematic diagram of cloud-edge-end coordinated processing according to an embodiment of the present disclosure.

In an embodiment of the present disclosure, as shown in FIG. 13, for an application scenario of the Internet of Things, coordinated management of a cloud, an edge, and an end (that is, the Internet of Things cloud, the Internet of Things edge, and the Internet of Things device) provides a function of regional autonomy, ensures data consistency between the Internet of Things edge (that is, the edge computing platform) and the Internet of Things cloud, ensures that a connection can be reestablished after an abnormal disconnection between the Internet of Things edge and the Internet of Things cloud, and manages a plurality of edge end devices to perform linkage control by using the coordinated management of the cloud, the edge, and the end.

As shown in FIG. 13, a cloud-edge collaboration component that is used for collaborating with an Internet of Things cloud exists in an Internet of Things edge. The cloud-edge collaboration component mainly includes two parts: data stream communication and management stream communication. According to the cloud-edge collaboration component, transmission of a data stream and transmission of a management stream may be performed between the Internet of Things edge and the Internet of Things cloud. The Internet of Things cloud may perform operations such as security authentication and rule file delivery on the Internet of Things edge. The Internet of Things edge can synchronize data to the Internet of Things cloud to implement offline reconnection.

In addition, a processing rule in the Internet of Things system may be extracted, to implement an edge rule engine located at the Internet of Things edge. Flexible processing rules describe service requirements and automated management processes. Specifically, massive Internet of Things devices report collected Internet of Things data to the Internet of Things edge, and the Internet of Things edge controls the massive Internet of Things devices according to processing of the Internet of Things data. A processing logic at the Internet of Things edge mainly consists of two parts: data preprocessing and a rule engine core that works asynchronously. Implementation of the processing logic at the Internet of Things edge is based on an edge rule file and an edge database.

Data preprocessing mainly refers to an extract-transform-load (ETL) process. Specifically, data preprocessing includes data cleaning and data conversion. The rule engine core that works asynchronously includes a logical rule used for determining a logical relationship, an association rule used for determining an association relationship, a conditional rule used for determining a condition, a decision tree, and the like.

According to the system architecture shown in FIG. 13, the Internet of Things edge may implement regional autonomy. When a network between the Internet of Things edge and the Internet of Things cloud is interrupted, the Internet of Things edge may still implement local autonomy and a self-recovery function. The Internet of Things device gathers data collected by a sensor into the edge database, performs pipeline preprocessing on the device data at the Internet of Things edge, triggers a preset rule pipeline to perform rule calculation, notifies a related person of a triggered service early warning, and executes a control instruction according to a configuration rule. When the network is restored, important operation content is fed back to the Internet of Things cloud. When the network is faulty, the Internet of Things edge is responsible for data monitoring and device linkage, so as to implement regional autonomy.

In addition, the Internet of Things edge provides a rule calculation service closer to the Internet of Things device. The Internet of Things cloud is responsible for AI algorithm, big data analysis, and rule parameter configuration. After performing model training and upgrading, the Internet of Things cloud may transmit a rule model parameter to the Internet of Things edge, to optimize a service of the Internet of Things edge, to form a closed loop. The Internet of Things edge periodically transmits device data to the Internet of Things cloud, to support continuous transmission of breakpoints with the Internet of Things cloud, and ensure data consistency with the Internet of Things cloud. Cloud-edge management of the Internet of Things mainly includes two aspects: First, control of infrastructure resources such as computing, storage, network, and virtualization. The Internet of Things cloud dynamically adjusts infrastructure resources of an edge database according to monitoring data such as a CPU, a memory, and a network that are reported by the Internet of Things edge, and executes a resource scheduling management policy of the Internet of Things cloud. Second is management and control of the Internet of Things device. The Internet of Things cloud and the Internet of Things edge collaborate to manage and control the Internet of Things device.

In addition, each Internet of Things edge accesses a limited quantity of Internet of Things devices, can perform limited control on only the accessed Internet of Things devices, and does not have the right to operate an Internet of Things device that accesses another Internet of Things edge. In the Internet of Things scenario, there is a requirement for linkage control of a plurality of cascaded Internet of Things edges. For example, when an average air pressure of a natural gas pipeline is less than 1500 Pa, all natural gas valves in an administrative region are closed. For such a service scenario, after the Internet of Things edge transparently transmits data to the Internet of Things cloud, the Internet of Things cloud gathers data of all Internet of Things edges for rule calculation, and when a service early warning is triggered, a linkage control instruction is delivered to a related Internet of Things edge for coordinated operation, so as to perform linkage control on Internet of Things devices managed by a plurality of Internet of Things edges.

The following describes an apparatus embodiment of the present disclosure, and may be used for performing the management method for an Internet of Things device in the foregoing embodiment of the present disclosure. For details not disclosed in this apparatus embodiment of the present disclosure, refer to the foregoing embodiment of the management method for an Internet of Things device in the present disclosure.

Figure 14:
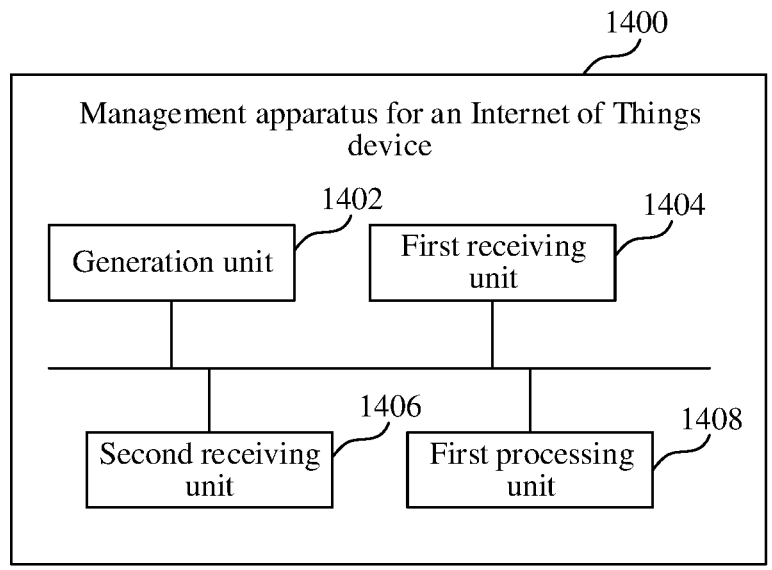
FIG. 14 is a block diagram of a management apparatus for an Internet of Things device according to an embodiment of the present disclosure.

FIG. 14 is a block diagram of a management apparatus for an Internet of Things device according to an embodiment of the present disclosure. The management apparatus for an Internet of Things device may be disposed in an edge computing platform.

As shown in FIG. 14, a management apparatus 1400 for an Internet of Things device according to an embodiment of the present disclosure includes: a generation unit 1402, a first receiving unit 1404, a second receiving unit 1406, and a first processing unit 1408.

The generation unit 1402 is configured to generate a reported value storage space and a desired value storage space for the Internet of Things device; the first receiving unit 1404 is configured to receive device actual configuration data reported by the Internet of Things device, and store the device actual configuration data into the reported value storage space; the second receiving unit 1406 is configured to receive a configuration instruction that is transmitted by a control end of the Internet of Things device and that includes desired configuration data, and store the desired configuration data into the desired value storage space; and the first processing unit 1408 is configured to: synchronize the desired configuration data stored in the desired value storage space into the Internet of Things device when the desired configuration data stored in the desired value storage space is different from the device actual configuration data stored in the reported value storage space.

In some embodiments of the present disclosure, based on the foregoing solution, the first processing unit 1408 is configured to: detect a network status of the Internet of Things device; and continue to detect the network status of the Internet of Things device in response to detecting that the Internet of Things device is in an offline state, until it is detected that the Internet of Things device switches from the offline state to an online state, and synchronize, to the Internet of Things device, the desired configuration data stored in the desired value storage space.

In some embodiments of the present disclosure, based on the foregoing solution, the first processing unit 1408 is configured to: synchronize, to the Internet of Things device, desired configuration data that is stored in the desired value storage space and that is received last time, after it is detected that the Internet of Things device switches from the offline state to the online state when configuration instructions transmitted by the control end for a plurality of times are received in a process in which the Internet of Things device is in the offline state.

In some embodiments of the present disclosure, based on the foregoing solution, the first processing unit 1408 is configured to: obtain, in response to detecting that the Internet of Things device switches from the offline state to the online state, latest device actual configuration data reported by the Internet of Things device; and synchronize, to the Internet of Things device, the desired configuration data stored in the desired value storage space when the latest device actual configuration data is different from the desired configuration data stored in the desired value storage space.

In some embodiments of the present disclosure, based on the foregoing solution, the first processing unit 1408 is configured to: synchronize, to the Internet of Things device, the desired configuration data stored in the desired value storage space in response to detecting that the Internet of Things device is in an online state.

In some embodiments of the present disclosure, based on the foregoing solution, the management apparatus 1400 further includes: a first obtaining unit, configured to: obtain, from the reported value storage space, device actual configuration data most recently reported by the Internet of Things device in response to receiving a device configuration query request transmitted by the control end; and a first transmitting unit, configured to return the obtained device actual configuration data most recently reported by the Internet of Things device to the control end.

In some embodiments of the present disclosure, based on the foregoing solution, the first receiving unit 1404 is further configured to: replace existing device actual configuration data in the reported value storage space with newly received device actual configuration data in a process of receiving device actual configuration data reported by the Internet of Things device for a plurality of times, or store, into the reported value storage space according to a time sequence, the device actual configuration data reported by the Internet of Things device for a plurality of times.

In some embodiments of the present disclosure, based on the foregoing solution, the second receiving unit 1406 is further configured to: replace existing desired configuration data in the desired value storage space with desired configuration data in a newly received configuration instruction in a process of receiving configuration instructions transmitted by the control end for a plurality of times, or store, into the desired value storage space according to a time sequence, desired configuration data transmitted by the control end for a plurality of times.

In some embodiments of the present disclosure, based on the foregoing solution, the management apparatus 1400 for an Internet of Things device further includes: a second obtaining unit, configured to obtain, according to an Internet of Things device data obtaining request on a service side, Internet of Things device data required on the service side; a second processing unit, configured to: generate a directed acyclic graph by using at least one conversion function used for data conversion processing as a node; and perform the data conversion processing on the obtained Internet of Things device data based on the directed acyclic graph, to obtain processed data; and a second transmitting unit, configured to transmit the processed data to the service side.

In some embodiments of the present disclosure, based on the foregoing solution, the management apparatus 1400 for an Internet of Things device further includes: a third obtaining unit, configured to obtain a processing policy for Internet of Things device data; and a third processing unit, configured to generate a rule pipeline according to the processing policy for the Internet of Things device data, the rule pipeline including a plurality of asynchronous events used for collecting to-be-processed Internet of Things device data; control the rule pipeline to enter a blocking state in response to detecting that at least one asynchronous event in the rule pipeline is triggered, and execute the at least one asynchronous event; and process, according to the processing policy in response to completion of execution of the at least one asynchronous event, Internet of Things device data collected based on the at least one asynchronous event, and reset a state of the rule pipeline to a non-blocking state.

In some embodiments of the present disclosure, based on the foregoing solution, each asynchronous event includes at least one routine, and each routine is used for collecting Internet of Things device data; and the third processing unit is configured to: control each asynchronous event in the at least one asynchronous event to enter the blocking state, and collect the Internet of Things device data by using a routine included in each asynchronous event; and determining that execution of each asynchronous event is completed in response to detecting that collection of Internet of Things device data is completed by the routine included in each asynchronous event in the at least one asynchronous event.

In some embodiments of the present disclosure, based on the foregoing solution, the edge computing platform communicates with an Internet of Things cloud; and the management apparatus 1400 for an Internet of Things device further includes: a third receiving unit, configured to receive a data processing policy transmitted by the Internet of Things cloud; and a fourth processing unit, configured to process obtained Internet of Things device data according to the data processing policy, to obtain a data processing result, and report the data processing result to the Internet of Things cloud.

In some embodiments of the present disclosure, based on the foregoing solution, the management apparatus 1400 for an Internet of Things device further includes a fourth receiving unit, configured to perform at least one of the following operations: receiving a device control instruction transmitted by the Internet of Things cloud, and controlling, according to the device control instruction, an Internet of Things device managed by the edge computing platform; and receiving a resource control instruction transmitted by the Internet of Things cloud, and adjusting, according to the resource control instruction, a resource that is of the edge computing platform and that is used for managing the physical network device.

Figure 15:
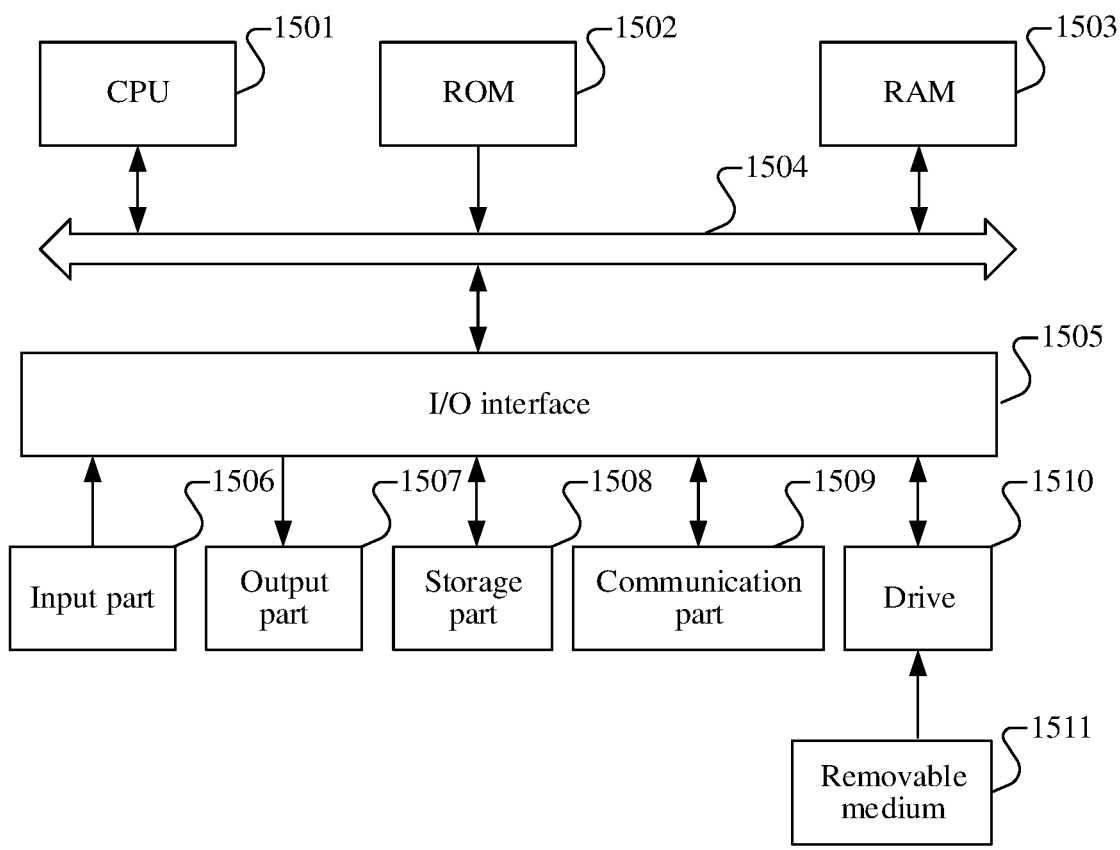
FIG. 15 is a schematic structural diagram of a computer system adapted to implement an electronic device according to an embodiment of the present disclosure.

FIG. 15 is a schematic structural diagram of a computer system adapted to implement an electronic device according to an embodiment of the present disclosure.

A computer system 1500 of the electronic device shown in FIG. 15 is merely an example, and does not constitute any limitation on functions and use ranges of the embodiments of the present disclosure.

As shown in FIG. 15, the computer system 1500 includes a central processing unit (CPU) 1501, which may perform various suitable actions and processing based on a program stored in a read-only memory (ROM) 1502 or a program loaded from a storage part 1508 into a random access memory (RAM) 1503, for example, perform the method described in the foregoing embodiments. The RAM 1503 further stores various programs and data required for operating the system. The CPU 1501, the ROM 1502, and the RAM 1503 are connected to each other through a bus 1504. An input/output (I/O) interface 1505 is also connected to the bus 1504.

The following components are connected to the I/O interface 1505: an input part 1506 including a keyboard, a mouse, and the like; an output part 1507 including, for example, a cathode ray tube (CRT), a liquid crystal display (LCD), a speaker, and the like; a storage part 1508 including a hard disk and the like; and a communication part 1509 including a network interface card such as a local area network (LAN) card or a modem. The communication part 1509 performs communication processing by using a network such as the Internet. A driver 1510 is also connected to the I/O interface 1505 as required. A removable medium 1511, such as a magnetic disk, an optical disc, a magneto-optical disk, or a semiconductor memory, is installed on the drive 1510 as required, so that a computer program read from the removable medium is installed into the storage part 1508 as required.

Particularly, according to an embodiment of the present disclosure, the processes described in the following by referring to the flowcharts may be implemented as computer software programs. For example, an embodiment of the present disclosure includes a computer program product. The computer program product includes a computer program stored in a computer readable medium. The computer program includes a computer program used for performing a method shown in the flowchart. In such an embodiment, by using the communication part 1509, the computer program may be downloaded and installed from a network, and/or installed from the removable medium 1511. When the computer program is executed by the CPU 1501, the various functions defined in the system of the present disclosure are executed.

The computer readable medium shown in the embodiments of the present disclosure may be a computer readable signal medium or a computer readable storage medium or any combination of the two. The computer readable storage medium may be, for example, but is not limited to, an electric, magnetic, optical, electromagnetic, infrared, or semi-conductive system, apparatus, or component, or any combination of the above. A more specific example of the computer readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer readable storage medium may be any tangible medium containing or storing a program, and the program may be used by or used in combination with an instruction execution system, an apparatus, or a device. In the present disclosure, the computer readable signal medium may include a data signal transmitted in a baseband or as part of a carrier, and stores a computer readable computer program. A data signal propagated in such a way may assume a plurality of forms, including, but not limited to, an electromagnetic signal, an optical signal, or any appropriate combination thereof. The computer readable signal medium may be further any computer readable medium in addition to a computer readable storage medium. The computer readable medium may transmit, propagate, or transmit a program that is used by or used in conjunction with an instruction execution system, an apparatus, or a device. A computer program included in the computer readable medium may be transmitted by using any appropriate medium, including but not limited to: wireless, wired, or the like, or any suitable combination of the foregoing.

The flowcharts and block diagrams in the accompanying drawings illustrate possible system architectures, functions and operations that may be implemented by a system, a method, and a computer program product according to various embodiments of the present disclosure. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in the accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of the present disclosure may be implemented in a software manner, or may be implemented in a hardware manner, and the unit described can also be set in a processor. Names of the units do not constitute a limitation on the units in a specific case.

In another aspect, the present disclosure further provides a computer readable medium, where the computer readable medium may be included in the electronic device described in the foregoing embodiment. The computer readable medium may alternatively exist separately and not be assembled into the electronic device. The computer readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of the present disclosure, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions of the embodiments of the present disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of the present disclosure.

After considering the specification and practicing the implementations of the present disclosure, a person skilled in the art may easily conceive of other implementations of the present disclosure. The present disclosure is intended to cover any variations, uses, or adaptations of the present disclosure. These variations, uses, or adaptations follow the general principles of the present disclosure and include common knowledge or technical means in the art that are not disclosed in the present disclosure.

It is to be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A management method for an Internet of Things device, performed by an edge computing platform communicatively connected to the Internet of Things device, the management method comprising:
   obtaining a processing policy for Internet of Things device data;
   generating a rule pipeline according to the processing policy for the Internet of Things device data, the rule pipeline comprising a plurality of asynchronous events used for collecting Internet of Things device data to be processed;
   controlling the rule pipeline to enter a blocking state in response to detecting that at least one asynchronous event in the rule pipeline is triggered, and executing the at least one asynchronous event;
   processing, according to the processing policy in response to completion of execution of the at least one asynchronous event, Internet of Things device data collected based on the at least one asynchronous event, and resetting a state of the rule pipeline to a non-blocking state;
   generating a reported value storage space and a desired value storage space for the Internet of Things device;
   receiving device actual configuration data reported by the Internet of Things device, and storing the device actual configuration data into the reported value storage space;
   receiving a configuration instruction that is transmitted by a control end of the Internet of Things device and that comprises desired configuration data, and storing the desired configuration data into the desired value storage space; and
   in response to the desired configuration data transmitted by the control end of the Internet of Things device and stored in the desired value storage space being different from the device actual configuration data reported by the Internet of Things device and stored in the reported value storage space, synchronizing the desired configuration data stored in the desired value storage space into the Internet of Things device.

2. The management method for an Internet of Things device according to claim 1, wherein the synchronizing the desired configuration data stored in the desired value storage space into the Internet of Things device comprises:
   detecting a network status of the Internet of Things device; and
   continuing to detect the network status of the Internet of Things device in response to detecting that the Internet of Things device is in an offline state, until the Internet of Things device switches from the offline state to an online state, and synchronizing, to the Internet of Things device, the desired configuration data stored in the desired value storage space.

3. The management method for an Internet of Things device according to claim 2, wherein the synchronizing the desired configuration data stored in the desired value storage space into the Internet of Things device comprises:

in response to that configuration instructions transmitted by the control end are received for a plurality of times while the Internet of Things device is in the offline state, synchronizing, after the Internet of Things device switches from the offline state to the online state, to the Internet of Things device, desired configuration data stored in the desired value storage space and received in a last time of the plurality of times.

4. The management method for an Internet of Things device according to claim 2, wherein the synchronizing the desired configuration data stored in the desired value storage space into the Internet of Things device comprises:

obtaining, in response to detecting that the Internet of Things device switches from the offline state to the online state, latest device actual configuration data reported by the Internet of Things device; and synchronizing, to the Internet of Things device, the desired configuration data stored in the desired value storage space when the latest device actual configuration data is different from the desired configuration data stored in the desired value storage space.

5. The management method for an Internet of Things device according to claim 1, wherein the synchronizing the desired configuration data stored in the desired value storage space into the Internet of Things device comprises:

synchronizing, to the Internet of Things device, the desired configuration data stored in the desired value storage space in response to detecting that the Internet of Things device is in an online state.

6. The management method for an Internet of Things device according to claim 1, further comprising:

obtaining, from the reported value storage space, device actual configuration data most recently reported by the Internet of Things device in response to receiving a device configuration query request transmitted by the control end; and returning the obtained device actual configuration data most recently reported by the Internet of Things device to the control end.

7. The management method for an Internet of Things device according to claim 1, further comprising at least one of:

replacing existing device actual configuration data in the reported value storage space with newly received device actual configuration data in a process of receiving device actual configuration data reported by the Internet of Things device for a plurality of times, or storing, into the reported value storage space according to a time sequence, the device actual configuration data reported by the Internet of Things device for a plurality of times; or replacing existing desired configuration data in the desired value storage space with desired configuration data in a newly received configuration instruction in a process of receiving configuration instructions transmitted by the control end for a plurality of times, or storing, into the desired value storage space according to a time sequence, desired configuration data transmitted by the control end for a plurality of times.

8. The management method for an Internet of Things device according to claim 1, further comprising:

obtaining, according to an Internet of Things device data obtaining request on a service side, Internet of Things device data required on the service side;

generating a directed acyclic graph by using at least one conversion function used for data conversion processing as a node;

performing the data conversion processing on the obtained Internet of Things device data based on the directed acyclic graph, to obtain processed data; and transmitting the processed data to the service side.

9. The management method for an Internet of Things device according to claim 1, wherein an asynchronous event of the at least one asynchronous event comprises at least one routine, a routine is used for collecting the Internet of Things device data; and the executing the at least one asynchronous event comprises:

controlling the asynchronous event in the at least one asynchronous event to enter the blocking state, and collecting the Internet of Things device data by using a routine comprised in the asynchronous event; and determining that execution of the asynchronous event is completed in response to detecting that collection of Internet of Things device data is completed by the routine comprised in the asynchronous event.

10. The management method for an Internet of Things device according to claim 1, wherein the edge computing platform is communicatively connected to an Internet of Things cloud; and the management method for the Internet of Things device further comprises:

receiving a data processing policy transmitted by the Internet of Things cloud;

processing obtained Internet of Things device data according to the data processing policy, to obtain a data processing result; and reporting the data processing result to the Internet of Things cloud.

11. The management method for an Internet of Things device according to claim 10, further comprising at least one of:

receiving a device control instruction transmitted by the Internet of Things cloud, and controlling, according to the device control instruction, an Internet of Things device managed by the edge computing platform; or receiving a resource control instruction transmitted by the Internet of Things cloud, and adjusting, according to the resource control instruction, a resource of the edge computing platform used for managing the physical network device.

12. A management apparatus disposed in an edge computing platform, the edge computing platform being communicatively connected to an Internet of Things device, the management apparatus comprising:

one or more processors; and at least one storage apparatus, configured to store one or more programs, when executed by the one or more processors, causing the one or more processors to implement:

obtaining a processing policy for Internet of Things device data;

generating a rule pipeline according to the processing policy for the Internet of Things device data, the rule pipeline comprising a plurality of asynchronous events used for collecting Internet of Things device data to be processed;

controlling the rule pipeline to enter a blocking state in response to detecting that at least one asynchronous event in the rule pipeline is triggered, and executing the at least one asynchronous event;

processing, according to the processing policy in response to completion of execution of the at least one asynchronous event, Internet of Things device data collected based on the at least one asynchronous event, and resetting a state of the rule pipeline to a non-blocking state;

generating a reported value storage space and a desired value storage space for the Internet of Things device;

receiving device actual configuration data reported by the Internet of Things device, and storing the device actual configuration data into the reported value storage space;

receiving a configuration instruction that is transmitted by a control end of the Internet of Things device and that comprises desired configuration data, and storing the desired configuration data into the desired value storage space; and in response to the desired configuration data transmitted by the control end of the Internet of Things device and stored in the desired value storage space being different from the device actual configuration data reported by the Internet of Things device and stored in the reported value storage space, synchronizing the desired configuration data stored in the desired value storage space into the Internet of Things device.

13. The management apparatus according to claim 12, wherein the synchronizing the desired configuration data stored in the desired value storage space into the Internet of Things device comprises:

detecting a network status of the Internet of Things device; and continuing to detect the network status of the Internet of Things device in response to detecting that the Internet of Things device is in an offline state, until the Internet of Things device switches from the offline state to an online state, and synchronizing, to the Internet of Things device, the desired configuration data stored in the desired value storage space.

14. The management apparatus according to claim 13, wherein the synchronizing the desired configuration data stored in the desired value storage space into the Internet of Things device comprises:

in response to that configuration instructions transmitted by the control end are received for a plurality of times while the Internet of Things device is in the offline state, synchronizing, after the Internet of Things device switches from the offline state to the online state, to the Internet of Things device, desired configuration data stored in the desired value storage space and received in a last time of the plurality of times.

15. The management apparatus according to claim 13, wherein the synchronizing the desired configuration data stored in the desired value storage space into the Internet of Things device comprises:

obtaining, in response to detecting that the Internet of Things device switches from the offline state to the online state, latest device actual configuration data reported by the Internet of Things device; and synchronizing, to the Internet of Things device, the desired configuration data stored in the desired value storage space when the latest device actual configuration data is different from the desired configuration data stored in the desired value storage space.

16. The management apparatus according to claim 12, wherein the synchronizing the desired configuration data stored in the desired value storage space into the Internet of Things device comprises:

synchronizing, to the Internet of Things device, the desired configuration data stored in the desired value storage space in response to detecting that the Internet of Things device is in an online state.

17. The management apparatus according to claim 12, wherein the one or more processors are further configured to implement:

obtaining, from the reported value storage space, device actual configuration data most recently reported by the Internet of Things device in response to receiving a device configuration query request transmitted by the control end; and returning the obtained device actual configuration data most recently reported by the Internet of Things device to the control end.

18. The management apparatus according to claim 12, wherein the one or more processors are further configured to implement at least one of:

replacing existing device actual configuration data in the reported value storage space with newly received device actual configuration data in a process of receiving device actual configuration data reported by the Internet of Things device for a plurality of times, or storing, into the reported value storage space according to a time sequence, the device actual configuration data reported by the Internet of Things device for a plurality of times; or replacing existing desired configuration data in the desired value storage space with desired configuration data in a newly received configuration instruction in a process of receiving configuration instructions transmitted by the control end for a plurality of times, or storing, into the desired value storage space according to a time sequence, desired configuration data transmitted by the control end for a plurality of times.

19. A non-transitory computer readable storage medium storing a computer program, when executed by at least one processor of an edge computing platform, cause the at least one processor to implement:

obtaining a processing policy for Internet of Things device data;

generating a rule pipeline according to the processing policy for the Internet of Things device data, the rule pipeline comprising a plurality of asynchronous events used for collecting Internet of Things device data to be processed;

controlling the rule pipeline to enter a blocking state in response to detecting that at least one asynchronous event in the rule pipeline is triggered, and executing the at least one asynchronous event;

processing, according to the processing policy in response to completion of execution of the at least one asynchronous event, Internet of Things device data collected based on the at least one asynchronous event, and resetting a state of the rule pipeline to a non-blocking state;

generating a reported value storage space and a desired value storage space for the Internet of Things device;

receiving device actual configuration data reported by the Internet of Things device, and storing the device actual configuration data into the reported value storage space;

receiving a configuration instruction that is transmitted by a control end of the Internet of Things device and that comprises desired configuration data, and storing the desired configuration data into the desired value storage space; and in response to the desired configuration data transmitted by the control end of the Internet of Things device and stored in the desired value storage space being different from the device actual configuration data reported by the Internet of Things device and stored in the reported value storage space, synchronizing the desired configuration data stored in the desired value storage space into the Internet of Things device.

* * * * *